United States Patent [19]

Maier et al.

[11] Patent Number: 4,729,053

[45] Date of Patent: Mar. 1, 1988

[54] PROCESS FOR THE PRODUCTION OF A LIGHTNING ARRESTER AND PRODUCTS PRODUCED THEREBY

[75] Inventors: Günther Maier, Wettingen; Joseph Mosele, Biberist; Roger Perkins, Baden-Rütihof, all of Switzerland

[73] Assignee: BBC Brown, Boveri & Company, Limited, Baden, Switzerland

[21] Appl. No.: 809,339

[22] Filed: Dec. 16, 1985

[30] Foreign Application Priority Data

Feb. 7, 1985 [CH] Switzerland ........................ 551/85

[51] Int. Cl.[4] ........................ H02H 1/04

[52] U.S. Cl. ........................ 361/118; 361/127

[58] Field of Search ........................ 361/117, 118, 126, 127; 338/20, 21

[56] References Cited

U.S. PATENT DOCUMENTS

| | | | |
|---|---|---|---|
| 3,753,198 | 8/1973 | Shimizu | 338/20 |
| 3,806,765 | 4/1974 | Matsuoka et al. | 361/117 |
| 4,069,465 | 1/1978 | Kouchich et al. | 338/20 |
| 4,092,694 | 5/1978 | Stetson | 361/127 X |
| 4,262,318 | 4/1981 | Shirakawa et al. | 361/127 |
| 4,364,021 | 12/1982 | Levinson | 338/20 |
| 4,377,541 | 3/1983 | Bobik | 264/56 |
| 4,450,426 | 5/1984 | Miyoshi et al. | 361/127 X |

FOREIGN PATENT DOCUMENTS

| | | |
|---|---|---|
| 0004349 | 3/1979 | European Pat. Off. . |
| 896386 | 11/1953 | Fed. Rep. of Germany . |
| 2338355 | 7/1973 | Fed. Rep. of Germany . |
| 2526137 | 10/1975 | Fed. Rep. of Germany . |
| 2620245 | 7/1976 | Fed. Rep. of Germany . |

*Primary Examiner*—A. D. Pellinen
*Assistant Examiner*—Derek S. Jennings
*Attorney, Agent, or Firm*—Burns, Doane, Swecker & Mathis

[57] ABSTRACT

A lightning arrester with a monolithic, active resistor core made of voltage-dependent resistance material based on ZnO is produced by mixing and grinding the base materials ZnO+metal oxides, producing pourable granules, filling into a silicone rubber tube and pressing cold-isostatically or radially into a moulding, sintering of the moulding into a self-supporting, monolithic resistor core, converting the resistor core, with an insulator by casting around, coating or painting with an epoxy resin, silicone material or concrete polymer or by drawing over a shrink-fit tube or by glazing. The resultant lightning arrester has a simple configuration, good reproducibility, cost-effective mass production.

5 Claims, 4 Drawing Figures

PROCESS FOR THE PRODUCTION OF A LIGHTNING ARRESTER AND PRODUCTS PRODUCED THEREBY

BACKGROUND OF THE INVENTION

The present invention relates to lightning arresters having active resistor cores formed of zinc oxide.

The invention is based on a process for the production of a lightning arrester based on ZnO in accordance with the class of the preamble of claim 1 and on a lightning arrester in accordance with the class of the preamble of claim 4.

In electrical engineering, the former, classical lightning arresters based on silicone carbide are being replaced by those based on metal oxides. The resistance material based on ZnO plays an outstanding part in this. The conventional designs use as a rule from certain voltages upwards - stack-like cores, composed of individual discs, made of voltage-dependent sintered resistance material (varistors). Such cores are known from numerous publications (cf. for example U.S. Pat. No. 4,335,417, No. DE-A-2 934 832, No. CH-A626 758). The height of the discs used is limited (e.g. to 60 mm) and the height to diameter ratio is generally less than 1.

Such stacks composed of individual resistance discs are, by their nature, not self-supporting and must therefore be braced, fitted or cast into an insulating housing or otherwise fixed in some way. At the same time, the heat developed during operation must be led away to the outside through the insulating housing.

The stack-like configuration of a conventional lightning arrester is—particularly at higher voltages and power ratings—expensive and complex and also incorporates additional risks due to the numerous internal contact areas.

It has already been proposed to embed a sintered rod-shaped ZnO resistor core in a porcelain mass and sinter the latter at a relatively low temperature into a solid insulator firmly connected to the resistor core. Such a connection between resistor core and insulator can be made without radial gap (cf. No. EP-A-0 004 349). This already represents a simplification of the design compared with the stack-like configuration of usual arresters.

However, there is the general need to simplify further the configuration and the production of lightning arresters based on ZnO varistors and to make them suitable for mass production.

OBJECTS AND SUMMARY OF THE INVENTION

An object of the present invention is to provide a process for the production and a simplified design of a lightning arrester which is not composed of individual discs and renders superfluous a self-supporting, stable insulator as a housing. In particular, expensive, brittle ceramic insulator housings (porcelain) are to be avoided wherever possible.

The essence of the invention consists in producing a single, self-supporting, monolithic resistor core and of jacketing it with an insulating material.

BRIEF DESCRIPTION OF THE DRAWINGS

The invention is described with reference to the following exemplary embodiments explained more closely by figures, in which.

DETAILED DESCRIPTION OF THE INVENTION

Figure 1:
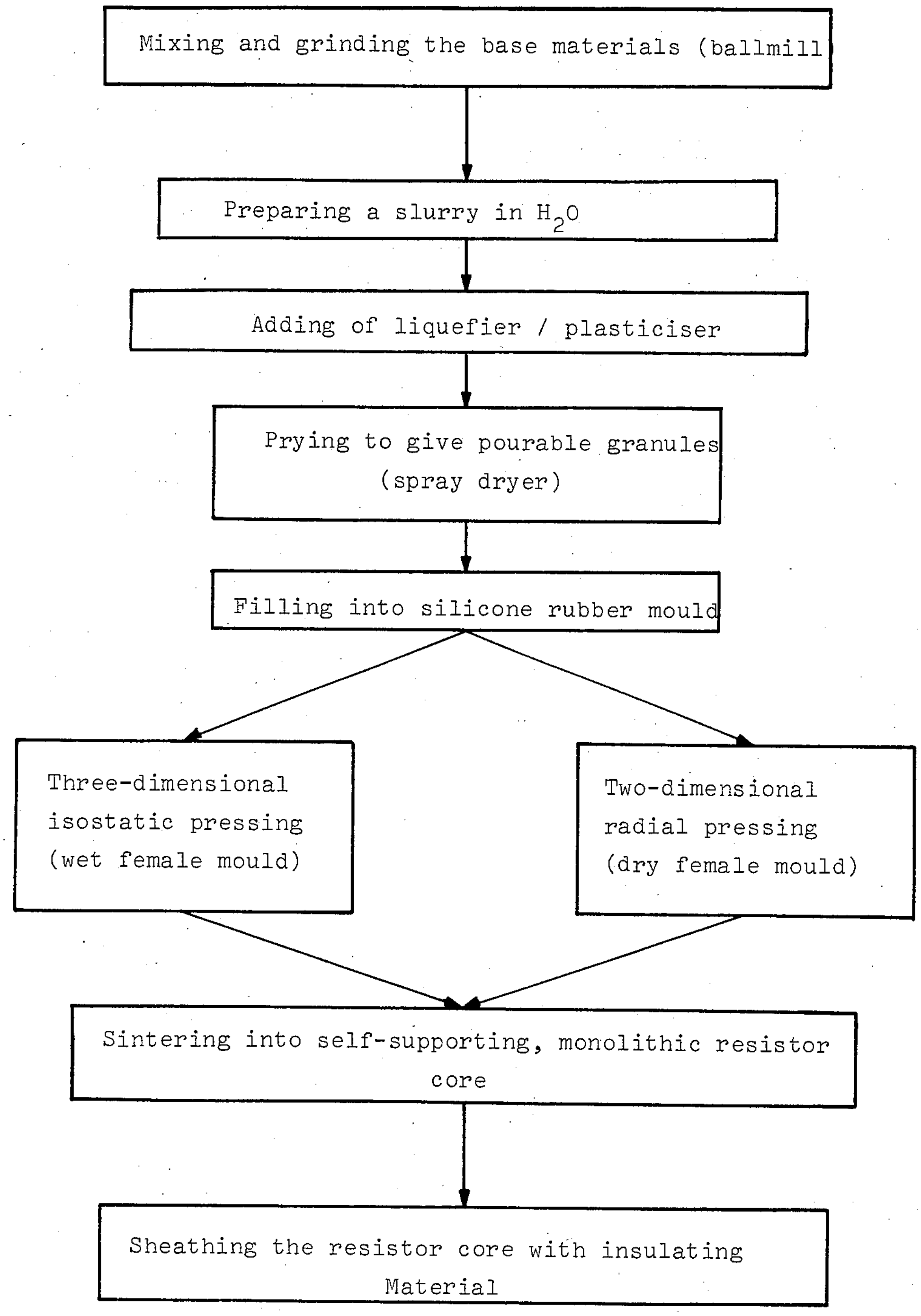
FIG. 1 shows a flow chart of the process of the present invention shown in block form.

In FIG. 1, the process for producing a lightning arrester is reproduced as a flow chart in block form. The individual steps are explained in detail below in terms of working examples. The pressing of the mass, present in the form of granules, filled into a flexible hollow mould (e.g. of silicone rubber) may be performed by the cold-isostatic method (wet female mould) or, more advantageously, by the two-dimensional radial method (dry female mould).

Figure 2:
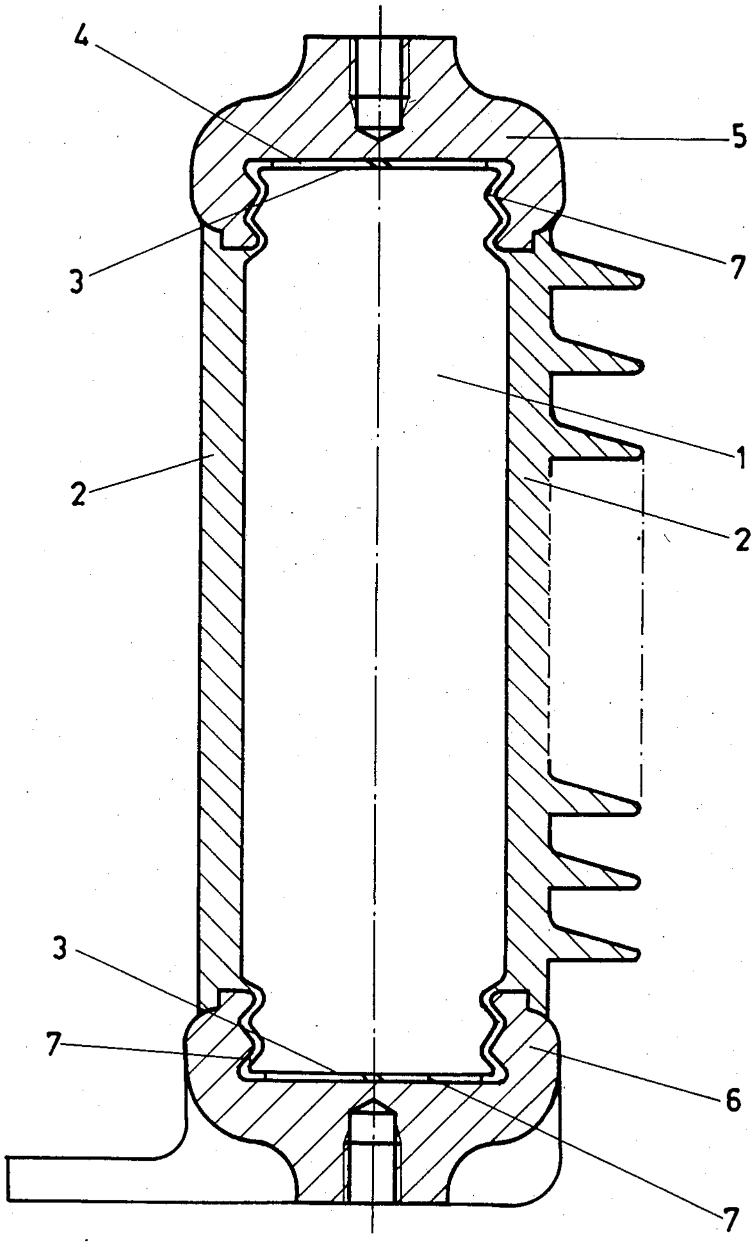
FIG. 2 shows a longitudinal section through a lightning arrester in accordance with the present invention with monolithic, substantially cylindrical, active resistor core (varistor) and with insulator as smooth or ribbed jacket.

FIG. 2 shows a simplified longitudinal section through a lightning arrester with monolithic, substantially cylindrical, active resistor core and with insulator designed as a jacket. The resistor core (varistor) 1 has a smooth, cylindrical surface area. In the present case, the resistor core 1 is made slightly corrugated at the ends to create better adhesive conditions in the adhering joint 7. An insulator jacket 2 consists of a castable plastic such as epoxy resin, concrete polymer, silicone material etc. However, a shrink-fit tube or another suitable sheathing or quite generally any appropriate coating by an insulating material can be used. Glazings or paints may also be considered for this. The metallised end 3 of the resistor core 1 is connected via the corresponding contact spring 4 to the high-voltage electrode 5 or earth electrode 6.

The left-hand half of the figure shows an insulator 2 with smooth cylindrical outer wall for indoor installation of the arrester, while the right-hand half relates to a design with ribs or screens for outdoor installation.

Figure 3:
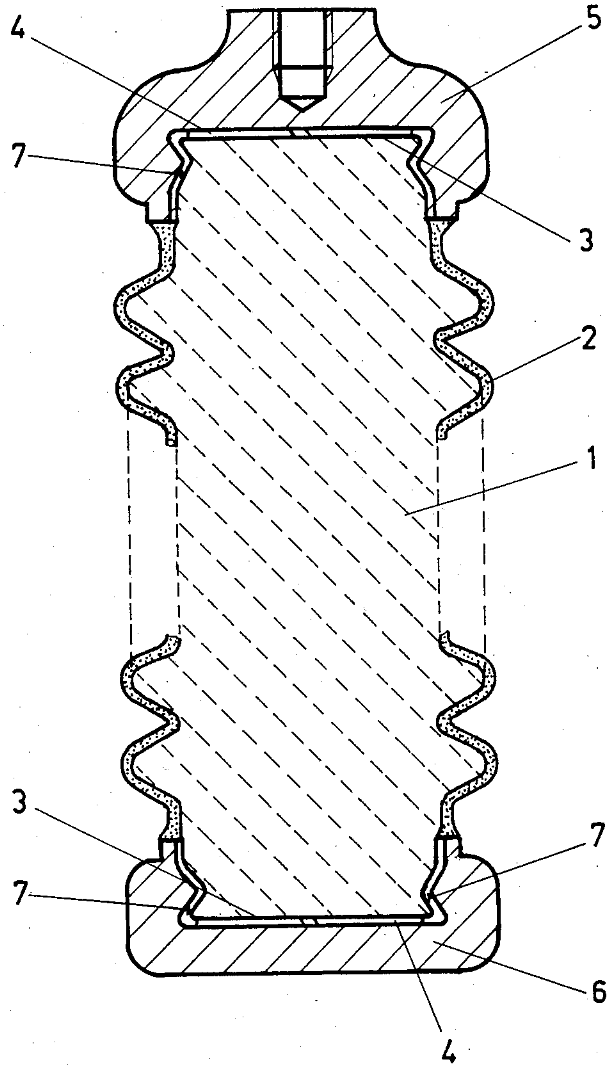
FIG. 3 shows a longitudinal section through a lightning arrester with monolithic, outside-ribbed resistor core and with an insulator as applied coating.

FIG. 3 represents a longitudinal section through a lightning arrester with monolithic, outside-ribbed resistor core. The insulator 2 is made as an additionally applied, comparatively thin coating of approximately constant thickness. All reference numbers correspond to those of FIG. 2.

Figure 4:
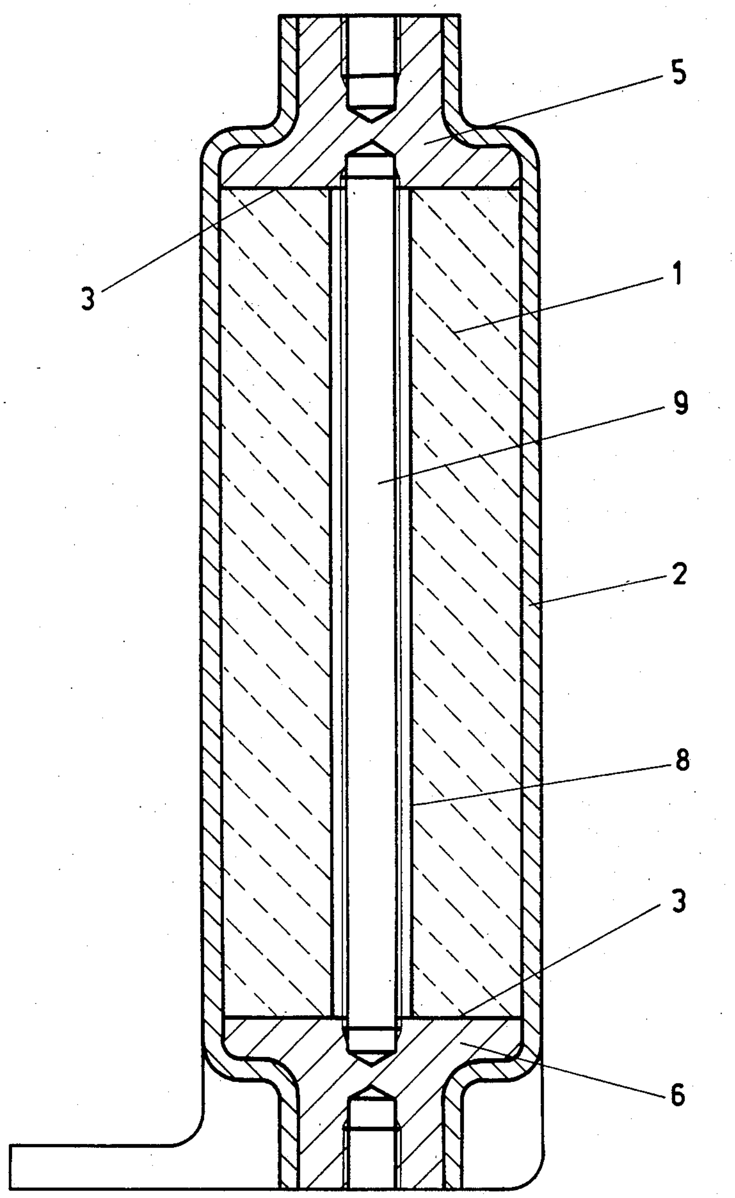
FIG. 4 shows a longitudinal section through a lightning arrester with monolithic, hollow-cylindrical resistor core, with central tie bar and with insulator as smooth jacket.

FIG. 4 shows a longitudinal section of a lightning arrester with a monolithic, hollow-cylindrical resistor core. The resistor core 1 has a central bore 8, in which the tie rod 9, provided with a thread and made of insulating material, is located. By means of the latter, the electrodes 5 and 6 are pressed firmly against the ends of the resistor core 1. All other reference numbers correspond to those of FIG. 2.

EXEMPLARY EMBODIMENT I

On the basis of ZnO, a lightning arrester was produced, the active resistor core 1 of which had the following composition:

ZnO = 97.0 mol %

$Bi_2O_3$=0.5 mol %

$Sb_2O_3$=1.0 mol %

$Co_2O_3$=0.5 mol %

$MnO_2$=0.5 mol %

$Cr_2O_3$=0.5 mol %

These base materials were mixed and ground for 10 hours under distilled water in a ball mill fitted with agate balls, producing a homogeneous powder mixture with a particle diameter of 1 to 5 μm. The powder mixture was reduced to a slurry in distilled water such that the solids content was 60% by weight. In order to reduce the viscosity, a commercially available low-alkaline liquefier was added to the suspension in a quantity of about 1‰ referred to the solids weight. Furthermore, to improve the plasticity of the later dry mass, a low-alkali polyvinyl alcohol was added in quantity of about 1% referred to the solids weight. This additive improves the subsequent processibility of the mass and simultaneously acts as a binder. This ensures in particular the homogeneous, flaw-free compaction of the mass and a high strength and dimensional stability of the moulding produced from it.

The slurry was then converted into pourable, dry granules in a spray drier with counter air flow. The average size of the grains thereby produced was about 100 μm, the residual moisture was about 2% by weight.

About 1.3 kg of the granules were then filled into a silicone rubber mould and compacted cold-isostatically by the wet mould method into a moulding. The hollow-cylindrical mould (diameter 59 mm, filling height 404 mm) was also closed with a lid and placed in an oil bath, which was then subjected to a pressure of 100 Mpa. This propagated on all sides onto the rubber mould so that a moulding with a density of 2950 kg/m$^3$ (53% of the theoretical value) was achieved. The moulding had a diameter of 43 mm at a height of 295 mm.

The moulding was removed from the mould and sintered at a temperature of 1200° C. for a period of 2 hours. In this process, the organic binder was burned out when passing through the temperature range from 200° to 600° C. and the shrinkage without deformation of the core carried out in a short time in the range from 900° to 1050° C. The finish-sintered resistor core 1 had a diameter of 35 mm at a length of 240 mm and a density of 5500 kg/m$^3$ (98% of the theoretical value).

The contacting of the monolithic sintered compact was performed by a single flame-spraying of its ends 3 with aluminium. The electrical transition was created by means of pressure contacts contact springs 4. The finished, contacted sintered compact was then provided with a 6 mm thick layer of a temperature-resistant organic material, in the present case an epoxy resin. This hollow-cylindrical smooth jacket for indoor installation of the arrester was produced by casting around the resistor core 1. For outdoor installation, the jacket may be provided with screens or ribs in order to enlarge the surface.

EXEMPLARY EMBODIMENT II

A lightning arrester with a resistor core 1 of the same dimensions and composition as in example I was produced. The process steps of mixing, grinding and drying the base materials correspond to those of example I.

About 1.3 kg of the granules were then filled into a hollow-cylindrical rubber mould and compacted cold-isostatically into a moulding by the dry mould method (radial pressing method). The hollow-cylindrical mould had an internal diameter of 69 mm at a filling height of 295 mm. It was closed off at the end by a ram. The hydraulic forces introduced from outside acted here exclusively radially (two-dimensionally), while in the axial direction only the reaction forces were exerted, without effecting a compression of the mass in this direction. The hydrostatic pressure was 100 Mpa. The moulding had a density of 2950 kg/m$^3$ (53% of the theoretical value), a diameter of 43 mm and a height of 295 mm.

The moulding was then removed from the mould and sintered at a temperature of 1200° C. for two hours in a way analogous to that specified in example I. The finished sintered compact had a diameter of 35 mm at a length of 240 mm and a density of 5500 kg/m$^3$ (98% of the theoretical value).

In addition to the metallising at the end, metal contacts were soldered onto the ends of the resistor core 1 for reinforcement. Finally, the resistor core 1 was provided with a smooth shrink-fit tube of silicone material as insulating jacket 2.

The pressing process in accordance with example II has the advantage that the moulding is better defined in its axial length, decisive for the operating voltage, and this length can easily be changed, corrected and adapted to the operating conditions by adjustment of the end ram. This is of particular significance when making monolithic resistor cores as the adaptation to the operating voltage cannot be performed subsequently—as for conventional arresters consisting of a number of discs—by variation of the number of discs. This process is also better suited to automation and mass production.

In the case of examples I and II, the continuous load voltage of the arrester was 24 kv, the residual voltage under a shock wave of 10 kA, 8/20 μs 70 kv.

The invention is not confined to the exemplary embodiments. With precompression, generally a moulding of at least 40% density and with sintering a sintered compact of at least 90% density, referred to the theoretical value, are intended. The height to diameter ratio of the resistor core can generally be greater than greater than 1. The resistor core may also have a form other than that of a smooth cylinder (FIG. 1). It may, for example, be bounded on the outside by ribs or grooves (FIG. 2) or have a bore (hollow cylinder in accordance with FIG. 3).

The insulator (jacket) may be made as a cast-around mass in epoxy resin, concrete polymer, silicone resin or as a sheathing in the form of a shrink-fit tube, a coating, a paint or a glazing.

In the simplest case for indoor installation, the arrester consists merely of a resistor core thinly coated with glass, paint or plastic with resilient metal contacts pressed on at the ends.

Because of the monolithic configuration of the resistor core (varistor core), there are practically no limits to how the lightning arrester may be designed.

We claim:

1. In a lightning arrester including an active resistor core made of a voltage-dependent resistance material based on ZnO, an insulator jacket, and terminal fittings serving as electrodes for electrical connections, the improvement comprising the active resistor core being a single, compact, monolithic workpiece having a substantially cylindrical shape with a height to diameter ratio greater than one and having a total of only two contact areas at its opposite ends, said ends each including at least one annular groove for improving adhesion with respect to adjacent electrodes.

2. Lightning arrester according to claim 1, wherein the insulator is a cylindrical jacket selected from the group consisting of cast resin, shrink-fit tubing, paint or glass.

3. A lightning arrester comprising an active resistor core formed of a voltage-dependent resistance material based upon ZnO formed as a monolithic structure having opposite ends, said opposite ends being formed with annular grooves therein to accept electrode members; first and second terminal electrodes fitted, respectively, to said opposite ends of the monolithic resistor core; and an insulating sheath formed about the core.

4. A lightning arrester in accordance with claim 3 wherein the resistor core has a substantially cylindrical shape with a height-to-diameter ratio greater than one.

5. A lightning arrester according to claim 3 wherein said insulating sheath has a cylindrical shape and is formed from a material selected from the group consisting of cast resin, shrink-fit resin, paint or glass.

* * * * *